United States Patent [19]
Eastman

[11] Patent Number: 5,340,482
[45] Date of Patent: Aug. 23, 1994

[54] SURFACE SKIMMING APPARATUS

[75] Inventor: Robert L. Eastman, Burburnett, Tex.

[73] Assignee: B-W Fabricators, Inc., Wichita Falls, Tex.

[21] Appl. No.: 110,386

[22] Filed: Aug. 23, 1993

[51] Int. Cl.$^5$ .............................................. B01D 21/18
[52] U.S. Cl. ................................... 210/525; 210/528; 210/541
[58] Field of Search ............... 210/523, 525, 528, 529, 210/530, 531, 541

[56] References Cited

U.S. PATENT DOCUMENTS

| | | | |
|---|---|---|---|
| 3,371,788 | 3/1968 | Smith | 210/525 |
| 3,919,090 | 11/1975 | Shaffer | 210/525 |
| 4,462,909 | 7/1984 | Kennel | 210/525 |
| 5,200,079 | 4/1993 | Schwartz et al. | 210/525 |

*Primary Examiner*—Christopher Upton
*Attorney, Agent, or Firm*—Arthur F. Zobal

[57] ABSTRACT

A tank is provided with an outer cylindrical wall having a vertical axis, and a bottom wall. A cylindrical scum baffle is located inward of the outer cylindrical wall. A support structure extends from the outer cylindrical wall to the vertical axis of the tank. A support pier extends from the bottom wall of tank upward at the vertical axis. A skimmer truss extends from an upper end of the support pier outward for rotation. A drive is supported by the support pier for rotating the skimmer truss. A cylindrical retaining wall is located inwardly from the scum baffle. A scum trough extends between the scum baffle and the retaining wall generally along a radial line from said vertical axis and is located below the skimmer truss. The scum trough has two generally parallel side walls and ramps having leading and trailing edges generally parallel to the scum trough walls. An elongated skimmer is supported by the skimmer truss for rotation with the skimmer truss. A guide is supported by the support structure and is located above the scum trough and the skimmer truss. An arm is supported by the skimmer truss for pivotal movement relative to the skimmer truss. One end of the arm extends downward and is connected to the skimmer, and the other end is located to enter the guide and to position the skimmer generally parallel with the leading edge of the scum trough as the skimmer approaches the scum trough.

10 Claims, 16 Drawing Sheets

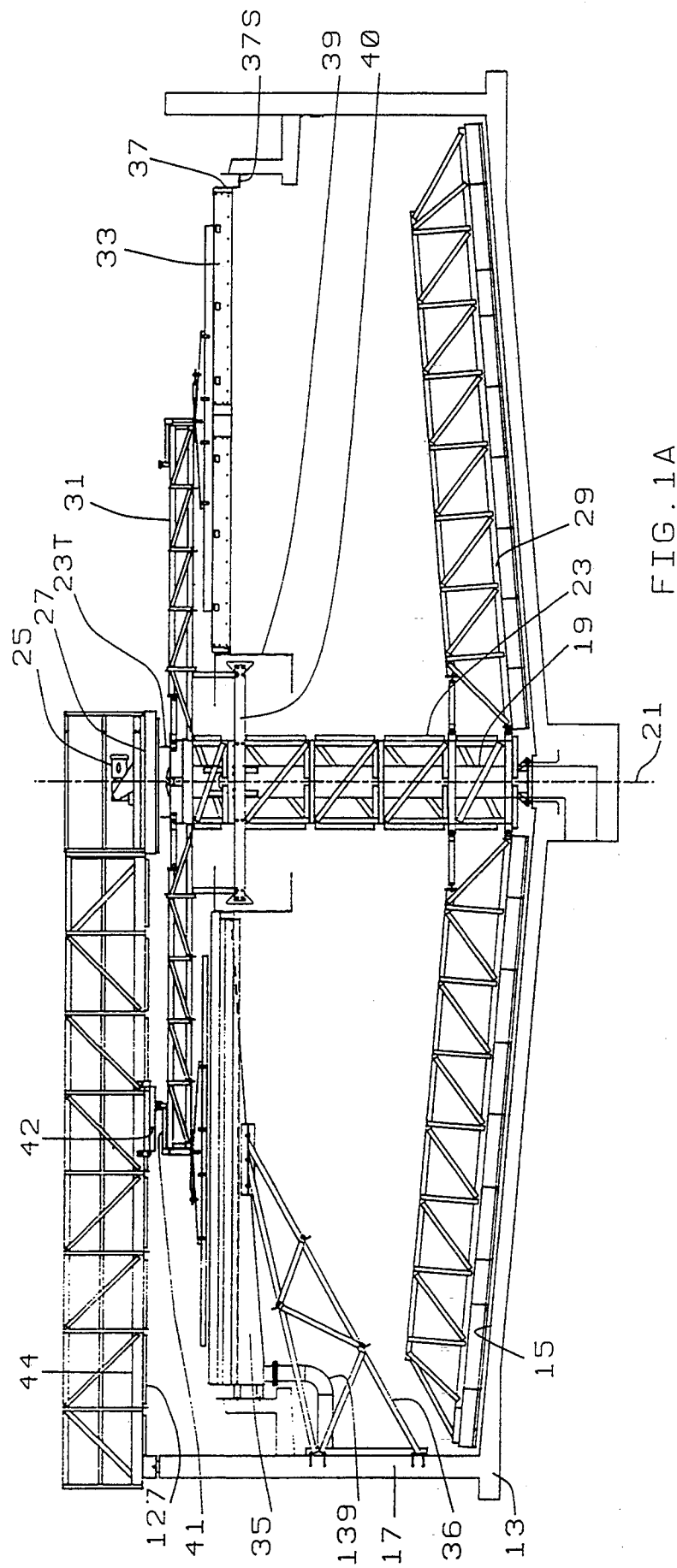

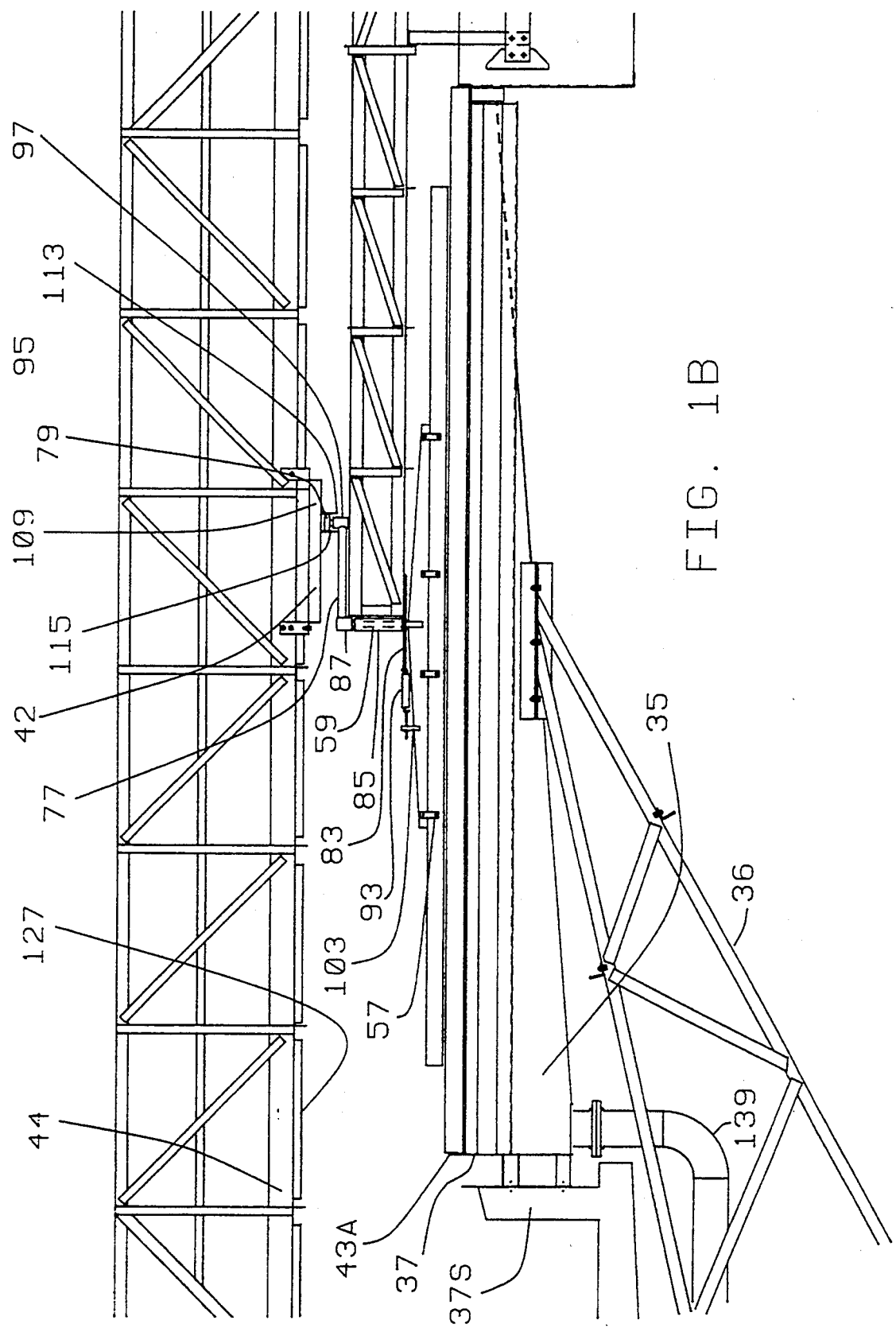

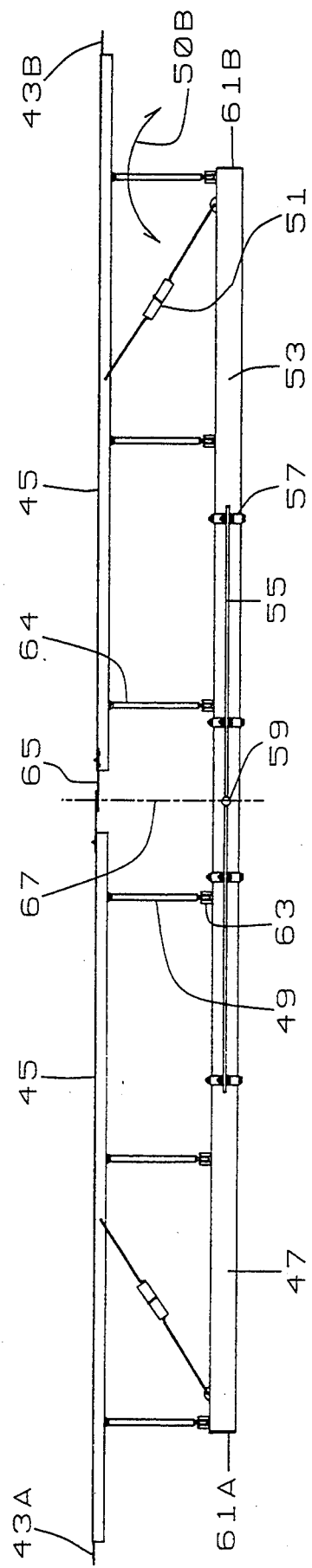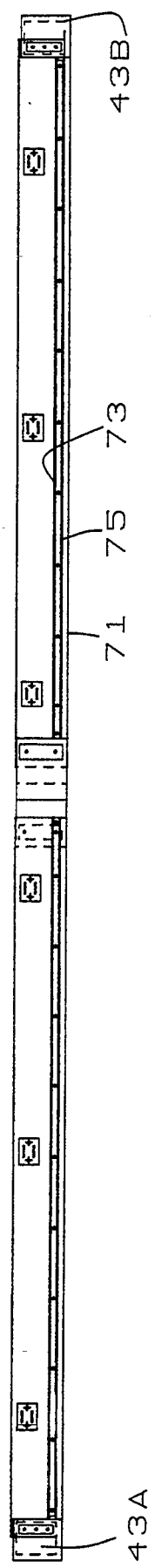

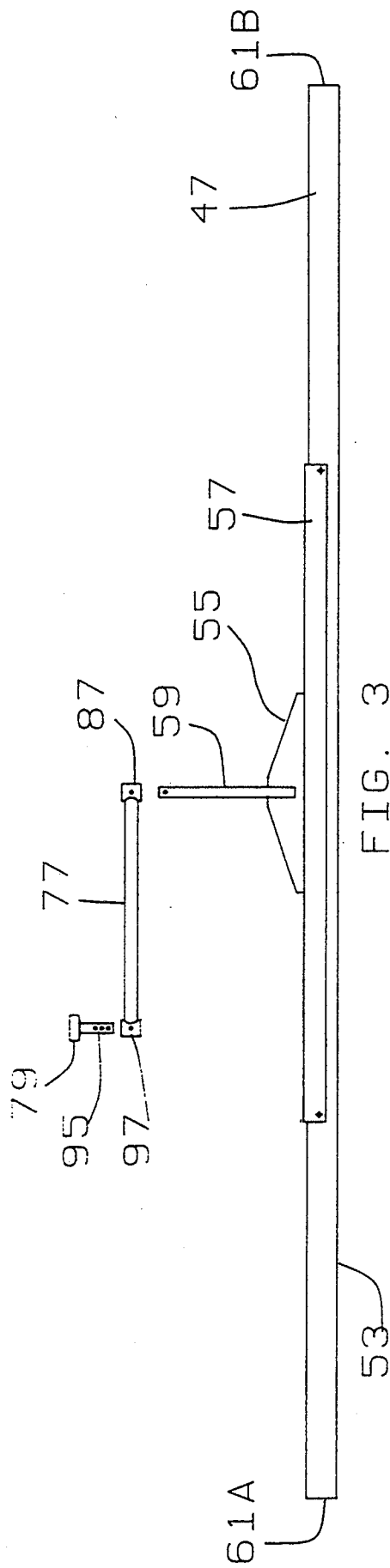
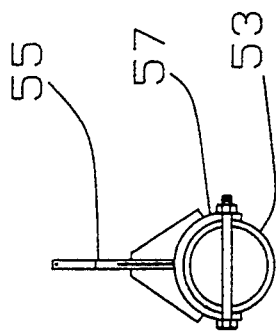
FIG. 3
FIG. 4

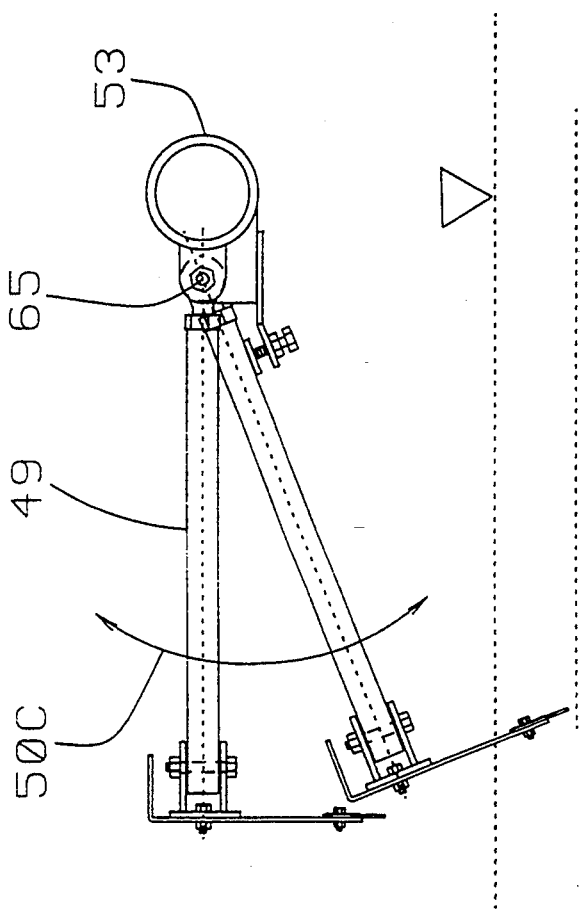
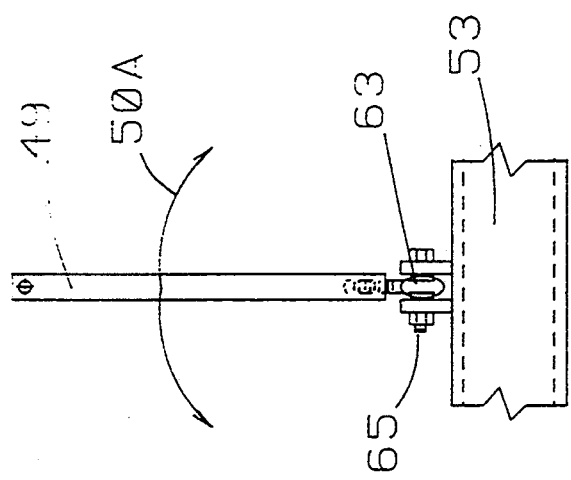
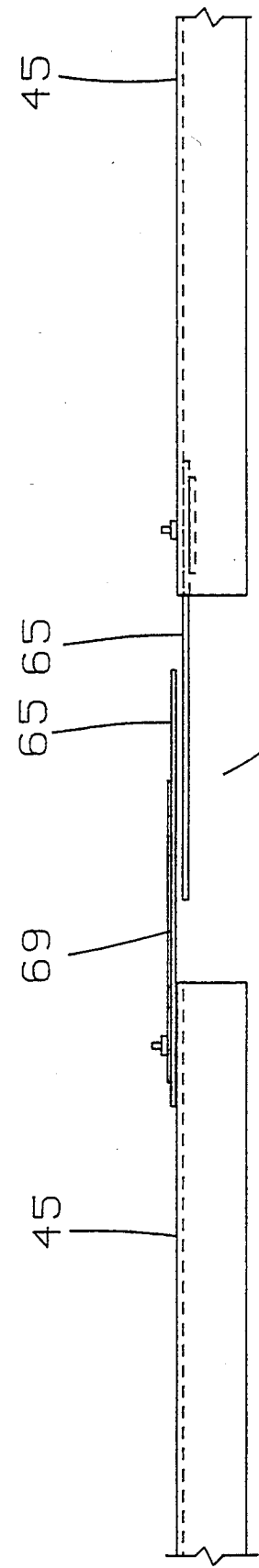
FIG. 6
FIG. 5
FIG. 7

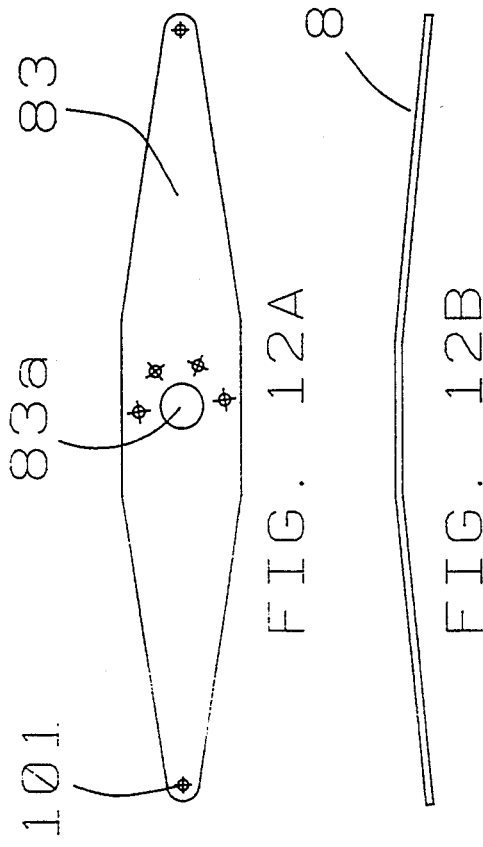
FIG. 12A
FIG. 12B
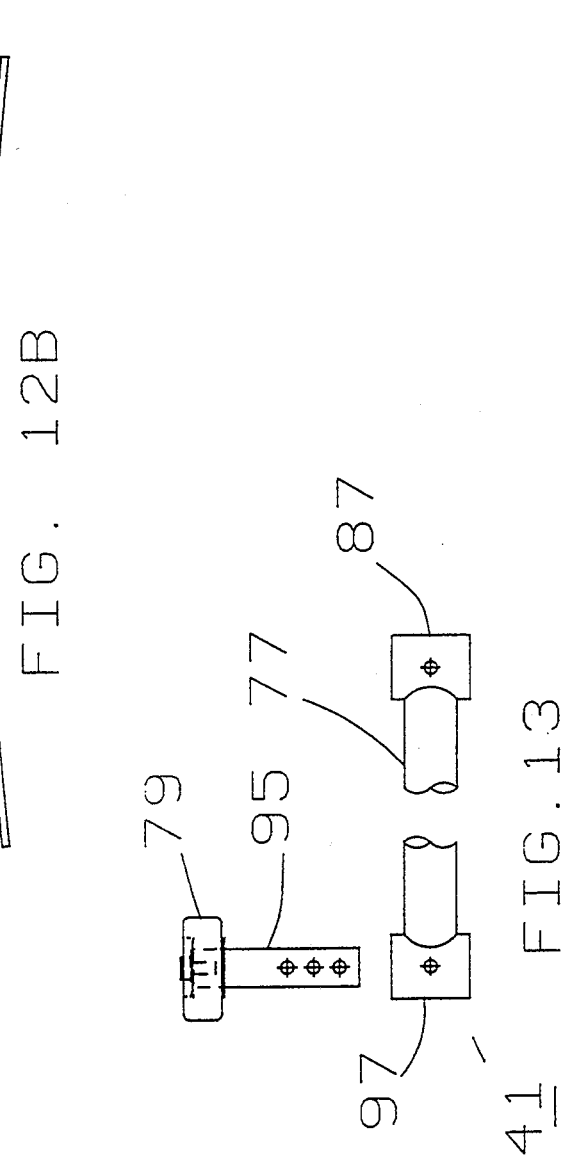
FIG. 13
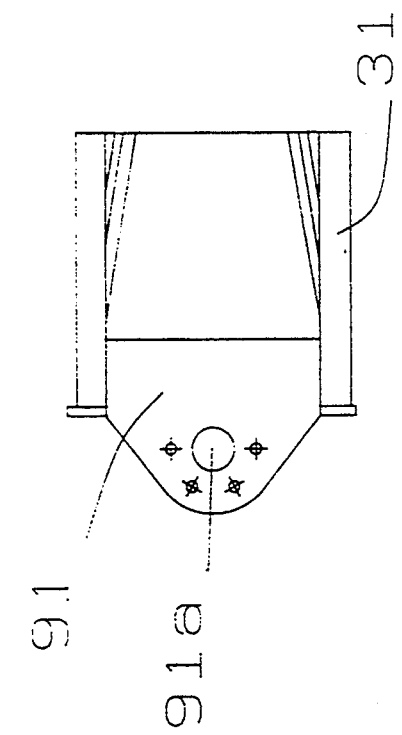
FIG. 11

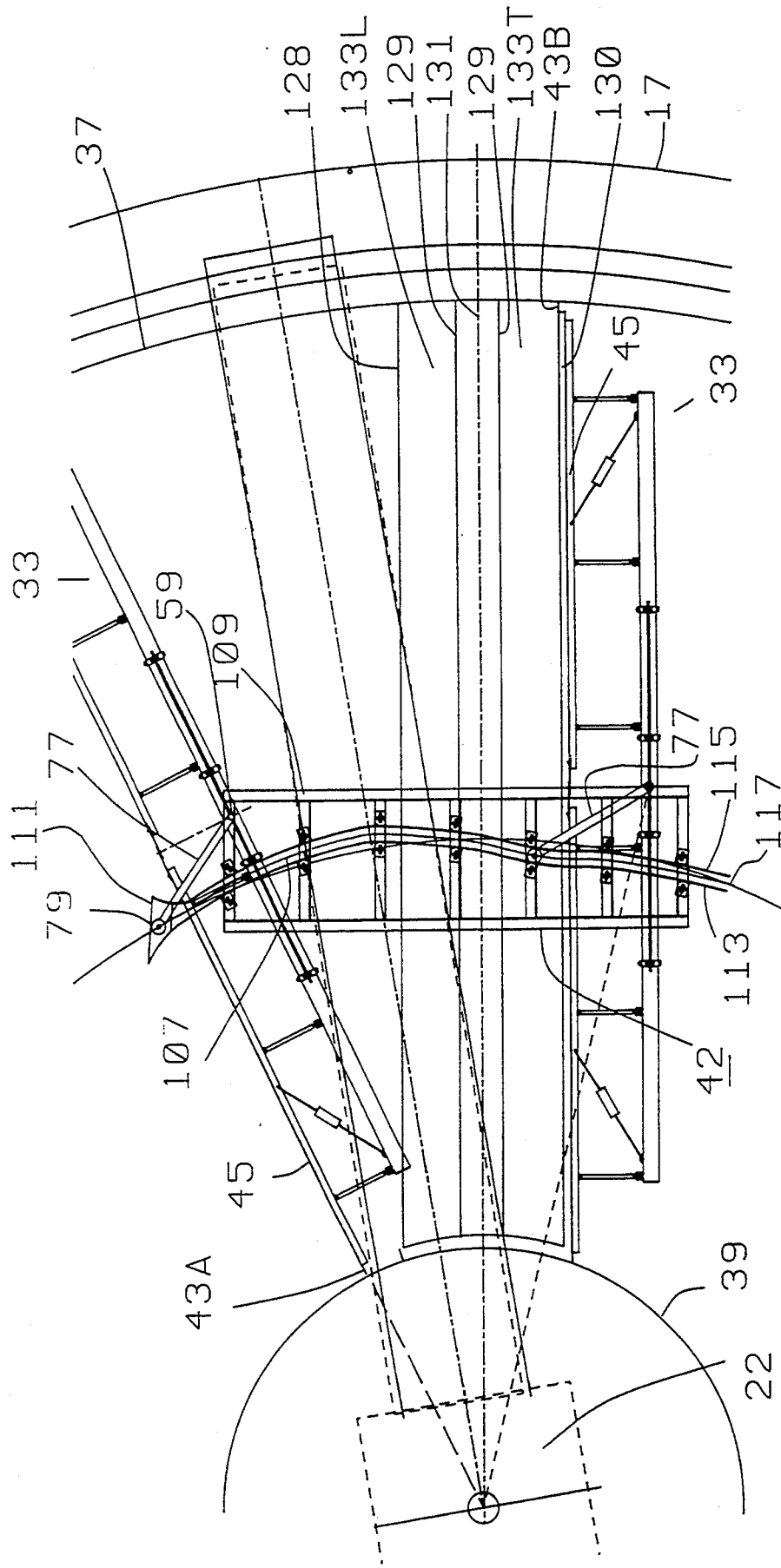

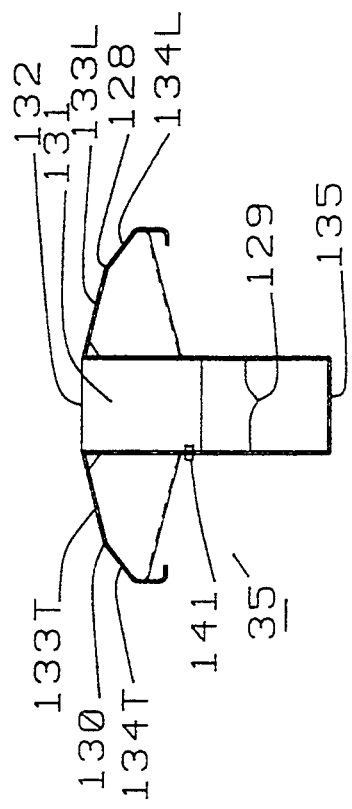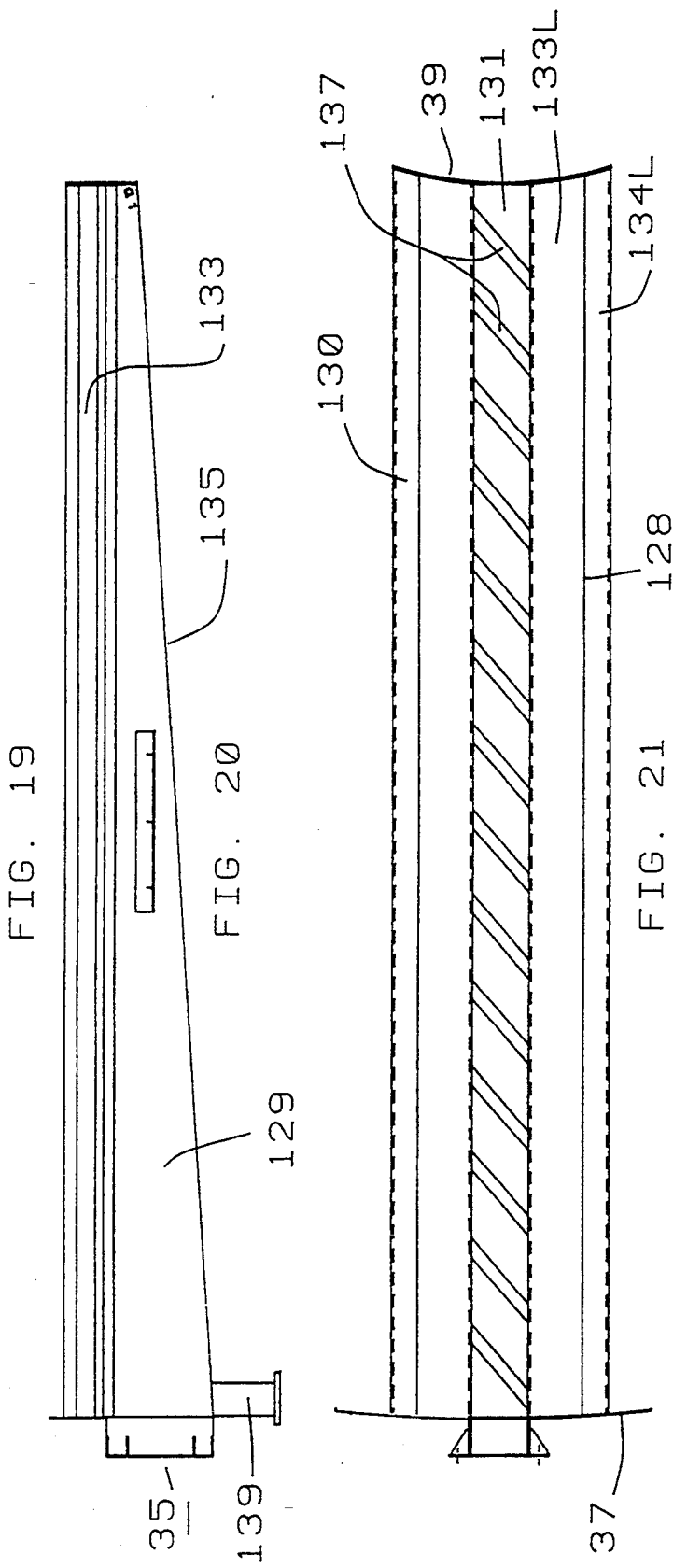
FIG. 19
FIG. 20
FIG. 21

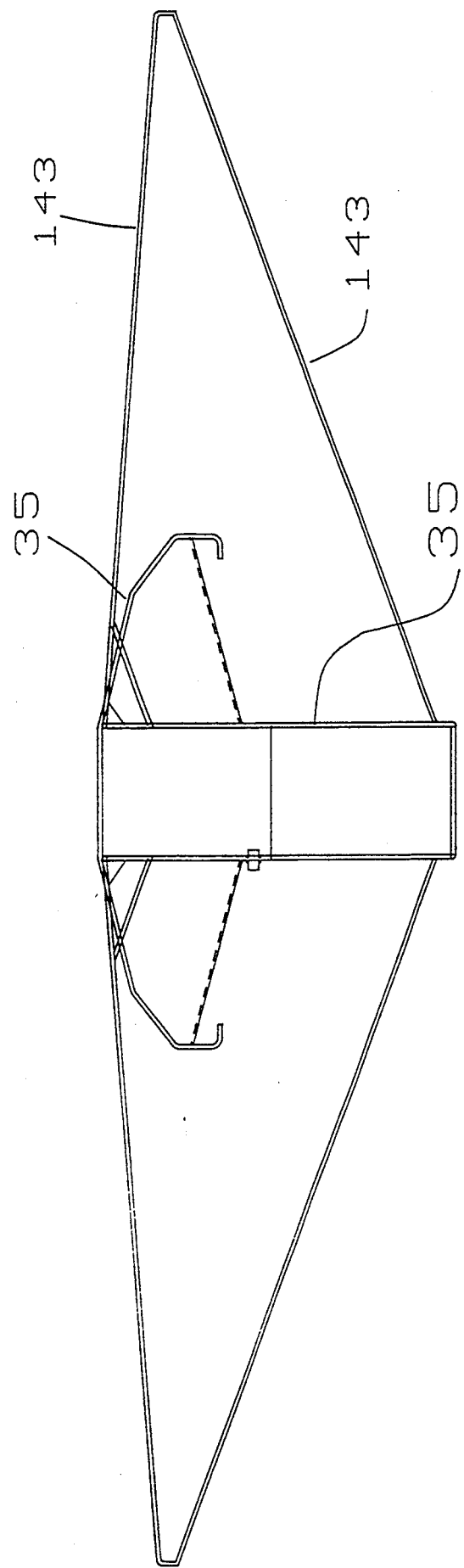

SURFACE SKIMMING APPARATUS

BACKGROUND OF THE INVENTION

1. Field of the Invention

The present invention relates to skimming mechanisms, in particular, a skimming mechanism for use in the removal of scum from water in wastewater treatment.

2. Description of the Prior Art

Wastewater created by residential and industrial uses of water must be cleaned before the water can be reintroduced into the environment or else toxicity problems arise. Water treatment plants treat wastewater by several different processes in order to remove wastes from water. Clarification is a process used to remove sedimentation and scum from wastewater. Clarifier tanks are commonly used to accomplish clarification.

High volumes of scum may be removed from wastewater by using a cylindrical clarifier tank equipped with an extended scum trough. Conventional radially oriented skimmers are rotated across the surface of wastewater contained in the tank. The skimmers rotate across the scum trough, which extends inwards from the edge of the tank, and deposit the scum into the scum trough. The scum is removed from the scum trough through piping which extends out of the clarifier tank.

A conventional scum trough has large trough beaches extending on both sides of the trough mouth into which the scum is deposited. The trough beaches slope upwards from the surface of the wastewater to the trough mouth so that the trough beaches may elevate the skimmers to the trough mouth. The skimmers rotate across the trough beaches as the skimmers approach and depart the scum trough. In order to retain accumulated scum on the skimmers the leading edge of the trough beach should be located parallel to a skimmer encountering the beach so the entire length of the skimmer is simultaneously elevated by the surface of the trough beach to the trough mouth. Furthermore, in order to smoothly lower the skimmer from the trough mouth to the surface of the wastewater the surface of the trailing trough beach should also be parallel to the skimmer. The trough beaches required for conventional radially oriented skimmers must be quite large in order to extend parallel to a skimmer from the leading edge of the trough to the trailing edge of the trough. Typical conventional scum troughs are substantially pie shaped.

Conventional radially oriented skimmers and conventional scum troughs suffer some disadvantages. The large scum troughs required for radially oriented skimmers are very heavy. The trough beaches must be ribbed for structural strength due to the weight of the trough. However, the ribs disrupt the smooth surface of the beaches and interfere with the beach-skimmer contact necessary for proper scum and fluid removal. Furthermore, ballasts must typically be added beneath the beaches to help keep the heavy troughs afloat. However, the heavy semi-flotation scum trough is subject to becoming unmoored within the clarifier tank by pulsation and fluctuation of the water surface whenever there is a high wind. In addition, the radially oriented skimmers are subject to scum escaping around the ends of the skimmers.

SUMMARY OF THE INVENTION

It is an object of the invention to provide a clarifying tank apparatus with skimmers capable of rotating in a radial orientation to contact and deposit scum into a scum trough having a leading edge and a trailing edge that generally is parallel to the scum trough mouth.

A clarifying water treatment apparatus is provided having a tank with an outer cylindrical wall means and a bottom wall. A support structure extends from the outer wall of the tank to the vertical axis of the tank. From the bottom wall of the tank along the vertical axis of the tank a support pier extends upwards. At the upper end of the support pier a skimmer truss extends outwards. Means for rotating the skimmer truss about the vertical axis of the tank is supported by the support pier. A scum trough having two generally parallel side walls and ramps having leading and trailing edges generally parallel to the walls extends between the outer cylindrical wall means and the retaining wall below the skimmer.

The skimmer truss supports an elongated skimmer for rotation about the vertical axis of the tank. A guide is supported by the support structure and located above the scum trough and the skimmer truss. The skimmer truss supports an arm which has two ends, where one end of the arm extends downward and is coupled to the skimmer and the other end of the arm is positioned to enter the guide to position the skimmer generally parallel with the leading edge of the scum trough as the skimmer approaches the scum trough.

In one aspect of the invention, the skimmer comprises an elongated boom and two skimmer members that are located at positions spaced from the boom. The skimmer members are movable relative to each other and to the boom. Spring means is provided for urging the outer ends of the skimmer members outward such that their outer ends engage the outer cylindrical wall means and the retaining wall respectively as the skimmer is rotated by the truss.

In a further aspect of the invention, means is provided for moving the skimmer to a radial position within the tank when the arm is located out of the guide.

BRIEF DESCRIPTION OF THE DRAWINGS

FIG. 1A is a cross-sectional view of the clarifying well apparatus.

FIG. 1B is a cross-section view of the scum trough and skimmer assembly of the clarifying well apparatus.

FIG. 2A is a plan view of a skimmer.

FIG. 2B is a plan view of skimmer blades.

FIG. 3 is a side view of the skimmer boom and the skimmer guide assembly.

FIG. 4 is a cross-sectional view of the boom pipe coupled by a hangar.

FIG. 5 is a plan view of a skimmer frame bar.

FIG. 6 is a cross-sectional view of a skimmer frame bar.

FIG. 7 is a plan view of the skimmer blades and back-up plates.

FIG. 11 is a plan view of the end of a support truss.

FIG. 12A is a plan view of the return spring plate.

FIG. 12B is a side view of the return spring plate.

FIG. 13 is an exploded view of the skimmer guide assembly.

FIG. 14A is a plan view of the skimmer shown in the clarifying tank in two locations as it moves through the scum trough area.

FIG. 19 is a cross-sectional view of the scum trough viewed end-on.

FIG. 20 is a side view of the scum trough.

FIG. 21 is a plan view of the scum trough.

FIG. 22 is a cross-sectional comparison between a conventional scum trough and the scum trough of the current invention.

DESCRIPTION OF THE PREFERRED EMBODIMENT

Figure 8:
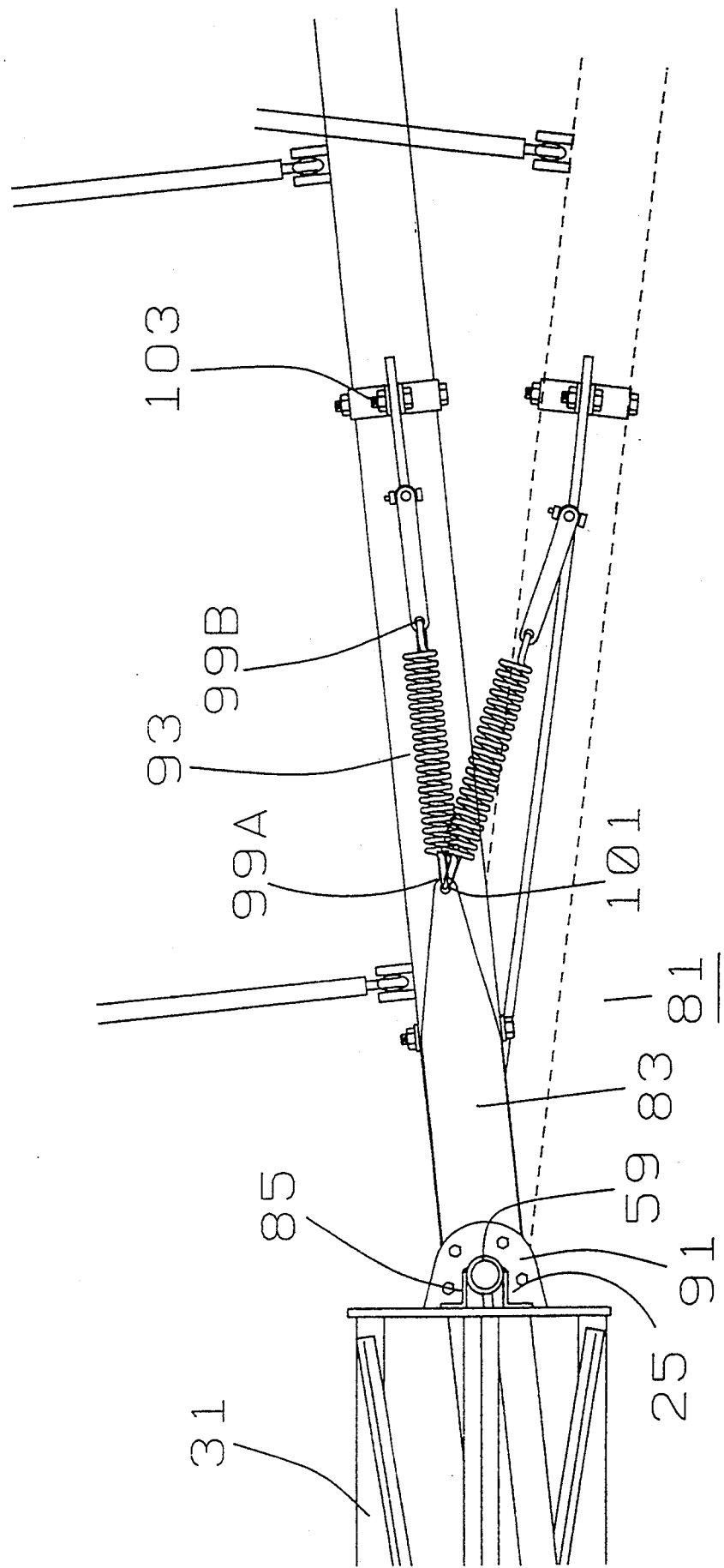
FIG. 8 is a plan view of the return spring assembly in its rest position and its extended position.
Figure 9:
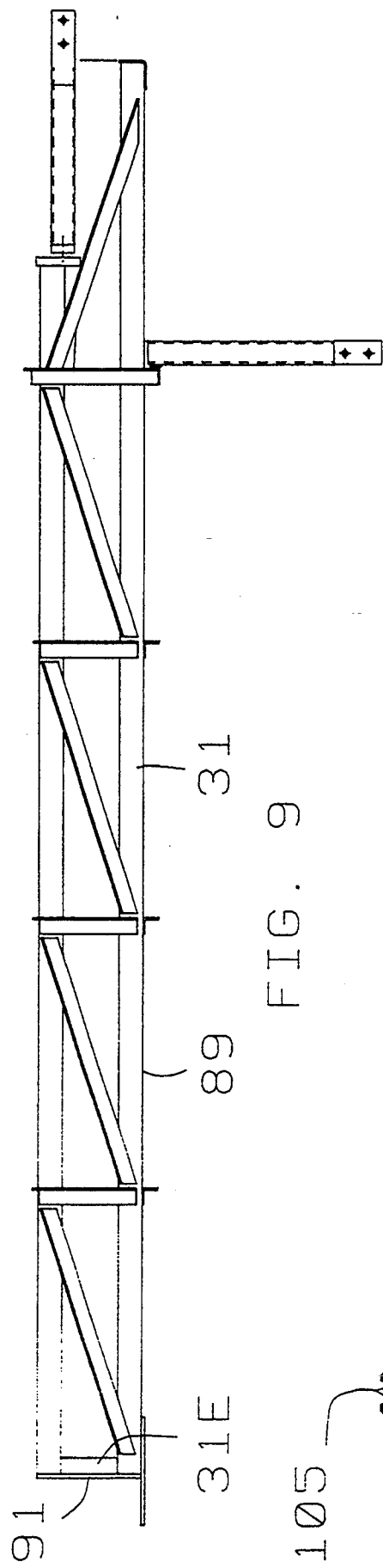
FIG. 9 is a side view of a support truss.
Figure 10B:
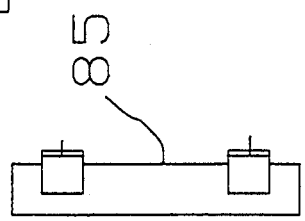
FIG. 10B is a side view of the pivot bearing housing.
Figure 10A:
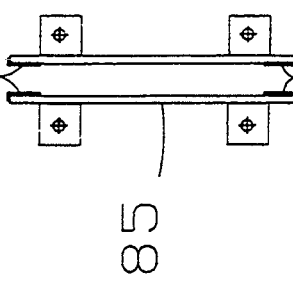
FIG. 10A is a plan view of the pivot bearing housing.

Referring now to FIG. 1A, the clarifying well apparatus 11 of the current invention is shown. A clarifying tank 13 has a basin floor 15 and an outer cylindrical wall 17. The tank 13 holds wastewater to be clarified. A center pier 19 extends upward from the basin floor 15 at the central axis 21 of the tank 13. The center pier 19 serves to support elements of the clarifier 11 and also serves as a conduit for conducting influent into the tank 13.

A drive cage 23 extends about the center pier 19. A drive 25 mounted on a central platform 27 located atop the center pier 19 is coupled to the drive cage 23 by way of a turntable 23T for rotation of the drive cage 23. Two truss rake scrapers 29 are mounted to the drive cage 23 for rotation therewith for stirring up wastewater along the basin floor 15. Two support trusses 31 for supporting extendable skimmers 33 are mounted to the drive cage 23 below the central platform 27 for rotation with the cage 23.

Referring also to FIGS. 1B and 19–21 an extendable skimmer 33 is coupled to each support truss 31 and is located to skim scum from the surface of the wastewater upon rotation about the axis 21 of the tank 13. The skimmers 33 deposit the scum skimmed from the wastewater into a scum trough 35 which accepts and removes the scum from the clarifier 11. The scum trough 35 is mounted to the outer -wall 17 of the tank 13 by trough support trusses 36, and extends inwardly, positioned to accept scum from the skimmers 33. The scum trough 35 has two spaced apart parallel walls 129 between which a scum trough mouth 131 extends. Scum trough beaches 133L and 133T descend from the scum trough mouth 131 to leading and trailing edges 128, 130 of the beaches 133. The leading and trailing edges 128, 130 of the beaches 133 extend parallel to the scum trough walls 129.

A cylindrical scum baffle 37 provides an outer wall which the skimmers 33 may wipe against when the skimmers 35 rotate about the tank 13, and a cylindrical influent well 39 provides an inner wall against which the skimmers 33 may wipe. The scum baffle 37 is located just inside the tank wall 17. The scum baffle 37 is held in place by a baffle support 37S which is coupled to the tank wall 17. The influent well 39 is located about the center pier 19 and the drive cage 23 beneath the support trusses 31. The influent well 39 may be mounted to the drive cage 23, for rotation therewith, with beams or channels 40, or mounted in a stationary position by being supported by two beams or channels which are spaced apart approximately the diameter of the influent well 39, are of such length to span the diameter of the tank and be supported by attachment to the tank wall at each end. In the latter case, the influent well 39 is stationary and the scum trough 35 may be attached thereto. In addition to providing an inner wall against which the skimmers wipe, the influent well 39 reduces turbulence in the tank 13 caused by discharge of influent into the tank 13 through the center pier 19.

A skimmer roller guide assembly 41 is attached to each skimmer 33 for conducting the skimmer 33 from its normal radial orientation in the tank 13 to a parallel orientation with respect to the scum trough 35 and back as the skimmer 33 approaches and exits the scum trough 35 area. A track assembly 42 accepts and guides the skimmer roller guide assembly 41 so that the skimmer 33 is conducted by the skimmer roller guide assembly 41 to and from a parallel orientation with respect to the scum trough 35. The track assembly 42 is attached to a walkway 44 which extends from the outer wall 17 of the tank 13 to the central platform 27.

As shown in FIGS. 1A, the skimmers 33 are designed to normally extend in a radial orientation between the influent well 39 and the scum baffle 37. Each skimmer 33 is located along a diameter extending across the tank 13 so that an arc of 180 degrees separates the two skimmers 33.

The skimmers 33 assume a non-radial position parallel to the scum trough 35 upon entering the scum trough area 35 in order to deposit more scum into the scum trough 35, to reduce the amount of scum bypassing the skimmers 33, and to reduce the size of the scum trough 35 required to remove the scum. The skimmers 33 are extendable so that the ends 43 of each skimmer 33 maintain contact with the influent well 39 and the scum baffle 37 upon assuming a non-radial orientation when entering the scum trough area 35 and upon assuming a radial orientation when located away from the scum trough area 35.

As shown in FIG. 2A each skimmer 33 is comprised of two skimmer blades 45 coupled to a skimmer boom 47. The skimmer blades 45 extend linearly between the influent well 39 and the scum baffle 37, with a small gap 67 located between the skimmer blades 45. The skimmer boom 47 extends parallel to the skimmer blades 45 but does not span the entire distance between the influent well 39 and the scum baffle 37. The skimmer blades 45 and the skimmer boom 47 are coupled together by skimmer frame bars 49 and skimmer extension springs 51.

Referring to FIG. 1B, each skimmer 33 is pivotally coupled to a rotatable skimmer support truss 31. As shown in FIG. 14A, upon rotation of the support truss 31 and skimmer 33, past the scum trough 35 the skimmer roller guide assembly 41 and track assembly causes the skimmer 33 to shift orientation in the tank 13 between a radially extending position and a position paralleling the scum trough 35. Pivotal movement of the skimmer 33 with respect to the support truss 31 also allows the skimmer blades 45 to extend further outward relative to each end of the boom 47 as the skimmer 33 moves from a radial orientation, thereby enabling the ends 43A, 43B of the skimmer blades 45 to maintain contact with the influent well 39 and the scum baffle 37 so that the scum does not escape around the ends 43A, 43B of the skimmer blades 45.

As shown in FIG. 3, the skimmer boom 47 is comprised of a boom pipe 53 having a boom plate 55 fastened thereon. The boom plate 55 is fastened to the boom pipe 53 by hangars 57. The boom plate 55 is located symmetrically about the midpoint of the boom pipe 55 on top of the boom pipe 55. A pivot shaft 59 is integrally coupled to the boom plate 55 and extends upwards from the boom plate 51 and boom pipe 53 at the midpoint of the boom pipe 53. The boom pipe 55 is capable of rotating about a vertical axis which coincides with the axis of the pivot shaft 59.

As shown in FIG. 2A, the skimmer blades 45 are located parallel to the skimmer boom 47, being positioned behind the skimmer boom 47 relative to the rotational direction of the skimmer 33 about the center pier 19. Three skimmer frame bars 49 extend transversely between the skimmer boom 47 and each skimmer blade 45 coupling together the skimmer boom 47 and the skimmer blades 45. As shown in FIG. 5, each skimmer frame bar 49 has one end hinged to the boom pipe 53 by a ball joint 63, thereby allowing the skimmer blades 45 to pivot in the direction of arrow 50A relative to the boom 47 in order to extend and retract laterally with respect to the skimmer boom 47. In addition as shown in FIG. 2A, each bar 49 has an end pivotally coupled to its blade 45 by bolts 64 for movement in the direction of arrow 50B relative to the blade. Furthermore, as shown in FIG. 6, the skimmer frame bars 49 are hinged for movement about bolts 65 which support the ball joints 63, so that the skimmer blades 45 may move in the direction of arrow 50C with respect to the skimmer boom 47 allowing the blades 45 to remain in constant contact with the surface of the wastewater.

Referring again to FIG. 2A, the two skimmer blades 45 are independently joined to the skimmer boom 47, allowing each skimmer blade 45 to independently extend or retract in response to rotation of the skimmer boom 47 about the axis of the pivot shaft 59. A skimmer extension spring 51 provides tension between a respective skimmer blade 45 and the boom pipe 53 causing the skimmer blades 45 to be urged outward relative to the ends of the boom pipe 61A, 61B to increase the total length of the skimmer blades 45 when the skimmer boom 47 rotates out of the radial position. Each respective skimmer extension spring 51 is coupled to the skimmer boom 47 near an end 61A, 61B of the boom pipe 53 and is coupled to its respective skimmer blade 45 at an inward position. The inwardly angled skimmer extension springs 51 urge the skimmer blades 45 to extended positions.

When the skimmer boom 47 and skimmer blades 45 are located in a radially oriented position, the tension of the springs 51 causes the ends 43A, 43B of the skimmer blades to contact and wipe against the scum baffle 37 and the influent well 39. The ends 43A and 43B are formed of flexible material. When the skimmer boom 47 and skimmer blades 45 rotate out of a radial orientation towards a position parallel relative to the scum trough 35, the distance between the scum baffle 37 and the influent well 37 increases and the springs 51 pull the skimmer blades 45 laterally outward so that the ends 43 of the skimmer blades 45 maintain continuous contact with the scum baffle 37 and the influent well 39. Upon return to a radial position the scum baffle and influent well 59 cause the blades 45 to return to a contracted position.

As shown in FIG. 7, a sliding combination of backup plates 65 extends between the skimmer blades 45. The backup plates 65 bridge the gap 67 between the skimmer blades 45 to prevent matter from escaping through the gap 67. Two hard plastic backup plates 65 are bolted to the skimmer blades 45, one backup plate 65 for each respective skimmer blade 45. The backup plates 65 extend laterally into the gap 67 from the skimmer blades 45 in an overlapping manner. The overlapping backup plates 65 are capable of lateral movement relative to each other, extending and retracting relative to the motion of the skimmer blades 45. The backup plates 65 overlap to an extent that the plates 65 remain overlapped when the skimmer blades 45 are maximally extended laterally by the skimmer extension springs 51. A stainless steel plate support 69 is attached to a skimmer blade 45 adjacently behind the backup plates 65 to provide support to the backup plates 65.

As shown in FIG. 2B, the skimmer blades 45 are equipped with flexible plastic wipers 71 and ends 43A and 43B. The wipers 71 extend along the base 73 of each skimmer blade 45. The wipers 71 contact the surface of the wastewater and skim the scum from the surface of the wastewater as the skimmer 33 rotates. A steel backup strip 75 is bolted along the base 73 of each skimmer blade 45 and to each wiper 71 to provide support for the wipers 71. The ends 43 contact the scum baffle 37 and the influent well 39 and prevent scum from escaping around the skimmer blades 45 as the skimmer 33 rotates through the tank 13.

The skimmer roller guide assembly 41 couples the skimmer 33 to the support truss 31 so that the skimmer roller guide assembly 41 normally maintains the skimmer 33 in a radially oriented position but guides the skimmer 33 into a parallel orientation relative to the scum trough 35 when the skimmer 33 approaches the scum trough 35. As shown in FIGS. 1B, 3, 8, and 15, the skimmer roller guide assembly 41 is comprised of a control arm 77, a guide roller 79, and a return spring assembly 81. The control arm 77 is fixedly coupled to the pivot shaft 59 of the skimmer 33 by way of a joint 87 so that the control arm 77 may provide torque to the pivot shaft 59 to cause the skimmer 33 to rotate out of its normal radial position to the parallel orientation. The guide roller 79 is coupled to the control arm 77 in a position to be engaged by the track assembly 42 which causes the control arm 77 to apply torque to the pivot shaft 59. The return spring assembly 81 applies force to cause the skimmer 33 to reassume a radial orientation after the guide roller 79 is disengaged from the track assembly 42.

The skimmer roller guide assembly 41 pivotally couples the skimmer 33 to the skimmer support truss 31. As shown in FIGS. 1B, 9–12, the pivot shaft 59 of the skimmer 33 extends upwards through an aperture 83A of a return spring plate 83, an aperture 91A of an end plate 91 secured to the end 31E of the truss 31 and a pivot bearing housing 85. The return spring plate 83 is bolted to the bottom 89 of the support truss 31 at the end 31E of the support truss 31 with the apertures 91A and 83A aligned and the pivot bearing housing 85 extends along and is bolted to the end 31E of the support truss 31. The joint 87 rests on and is pivotally supported on the support truss 31 by the pivot bearing housing 85. A return spring 93 couples the return spring plate 83 to the boom plate 55 of the skimmer boom 47. The return spring 93 applies force to the skimmer 33 to cause the skimmer 33 to return to a radial orientation after the guide roller 79 is disengaged from the track assembly 42.

The guide roller 79 is attached to the control arm 77 in a position to engage the track assembly 42. As shown in FIG. 13 the guide roller 79 is rotatably coupled to a guide roller arm 95 which is adjustably bolted to the control arm 77 at the guide arm end 97 of the control arm 77, opposite from the joint 87. The guide roller arm 95 extends upwards from the control arm 77 to the guide roller 79. The guide roller arm 95 is adjustably connected to the control arm 77 so that the guide roller 79 is positioned to be engaged by the track assembly 42 when the support truss 31 rotates about the axis of the tank 13.

As shown in FIG. 14A, upon entering the track assembly 42 the control arm 77 and the guide roller 79 provide torque to the pivot shaft 59 thereby rotating the pivot shaft 59 (in the bearing housing 85) and the pivoting skimmer 33 about a vertical axis which coincides with that of the pivot shaft 59. The control arm 77 angles back over the support truss 31 in a set position relative to the truss 31 and the skimmer 33 when the skimmer roller guide assembly 41 is not engaged by the track assembly 42. Then the guide roller 79 enters the track assembly 42 the position of the control arm 77 is controlled by the track assembly 42. The pivot shaft 59 is caused to rotate about its vertical axis as the position of the control arm 77 is changed by the track assembly 42. The rotation of the pivot shaft 59 causes the skimmer 33 to pivot between its radial orientation and its parallel orientation.

Upon exiting the track assembly 42 the skimmer 33 is returned to its normal radial orientation by the return spring assembly 81 of the skimmer roller guide assembly 41. The return spring assembly 81 is comprised of the return spring plate 83 and the return spring 93. As noted above, and as shown in FIGS. 1B, 8, 11 and 12, the return spring plate 83 is bolted to the bottom 89 of the end 31E of the support truss 31 and the return spring 93 is coupled to the return spring plate 83 and to the boom plate 55 of the skimmer boom 47. The return spring plate 83 extends beyond the end 31E of the support truss 31 parallel with the skimmer boom 47. One end 99A of the return spring 93 extends through and is coupled to a spring aperture 101 in the return spring plate 83. The other end 99B of the return spring 93 is coupled to a hangar 103 which is connected to the boom plate 55.

Referring to FIG. 8, the return spring 93 extends as the skimmer 33 pivots away from its radial orientation. The extended return spring 93 exerts force on the skimmer boom 47 to return to its radial orientation. While the skimmer guide assembly 41 is located in the track assembly 42 the force exerted by the control arm 77 on the skimmer 33 overcomes the force exerted by the return spring 93, causing the skimmer 33 to pivot as governed by the track assembly 42. When the skimmer roller guide assembly 41 is free of the track assembly 42, the extended return spring 93 exerts force on the skimmer boom 47 causing the skimmer boom 47 to reassume its radial orientation.

Figure 14B:
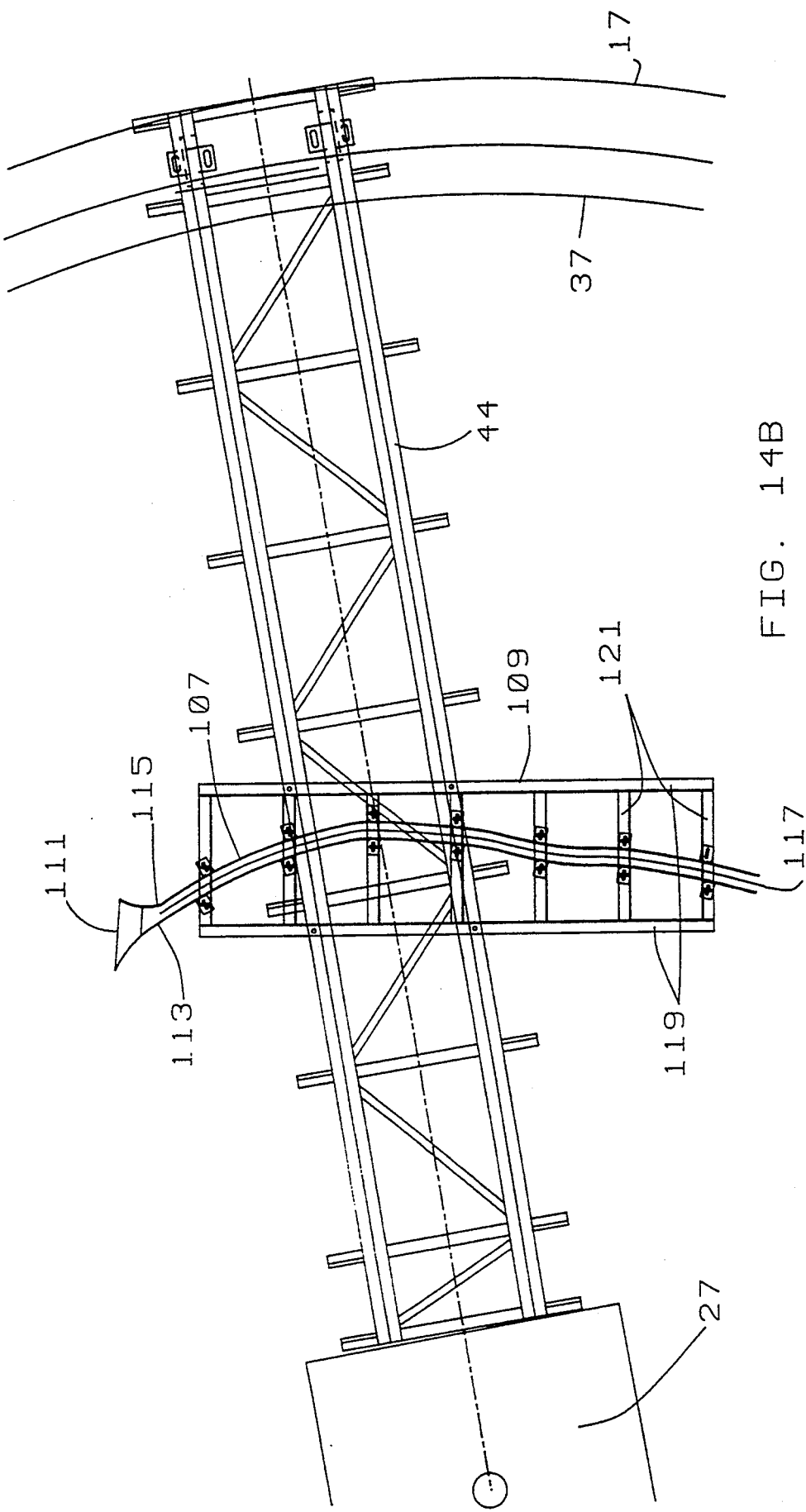
FIG. 14B is a top down view of the track assembly attached to the walkway.
Figure 15:
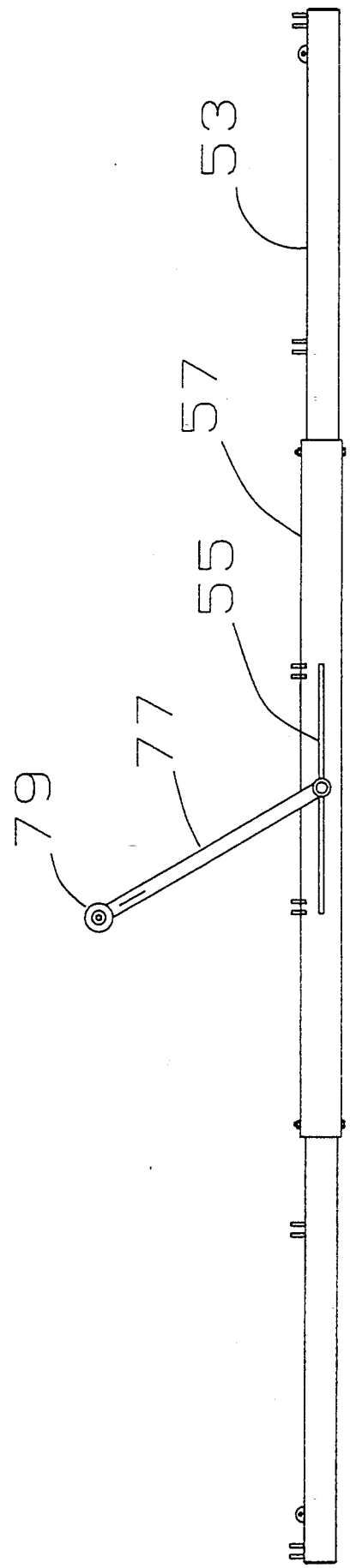
FIG. 15 is a plan view of the skimmer boom and the skimmer guide assembly.

The track assembly 42 accepts and guides the guide roller 79 thereby causing the skimmer roller guide assembly 41 to force the skimmer 33 from its radial orientation to its parallel orientation relative to the scum trough 35 as the skimmer 33 proceeds through the scum trough area 35, and back to its radial orientation as the skimmer 33 leaves the scum trough area 35. As shown in FIG. 14A, 14B the track assembly 41 is comprised of a track guide 107 mounted on a track support frame 109. The track guide 107 accepts and guides the guide roller 79, and the track support frame 109 holds the track guide 107 in a fixed position relative to the scum trough 35.

Figure 16:
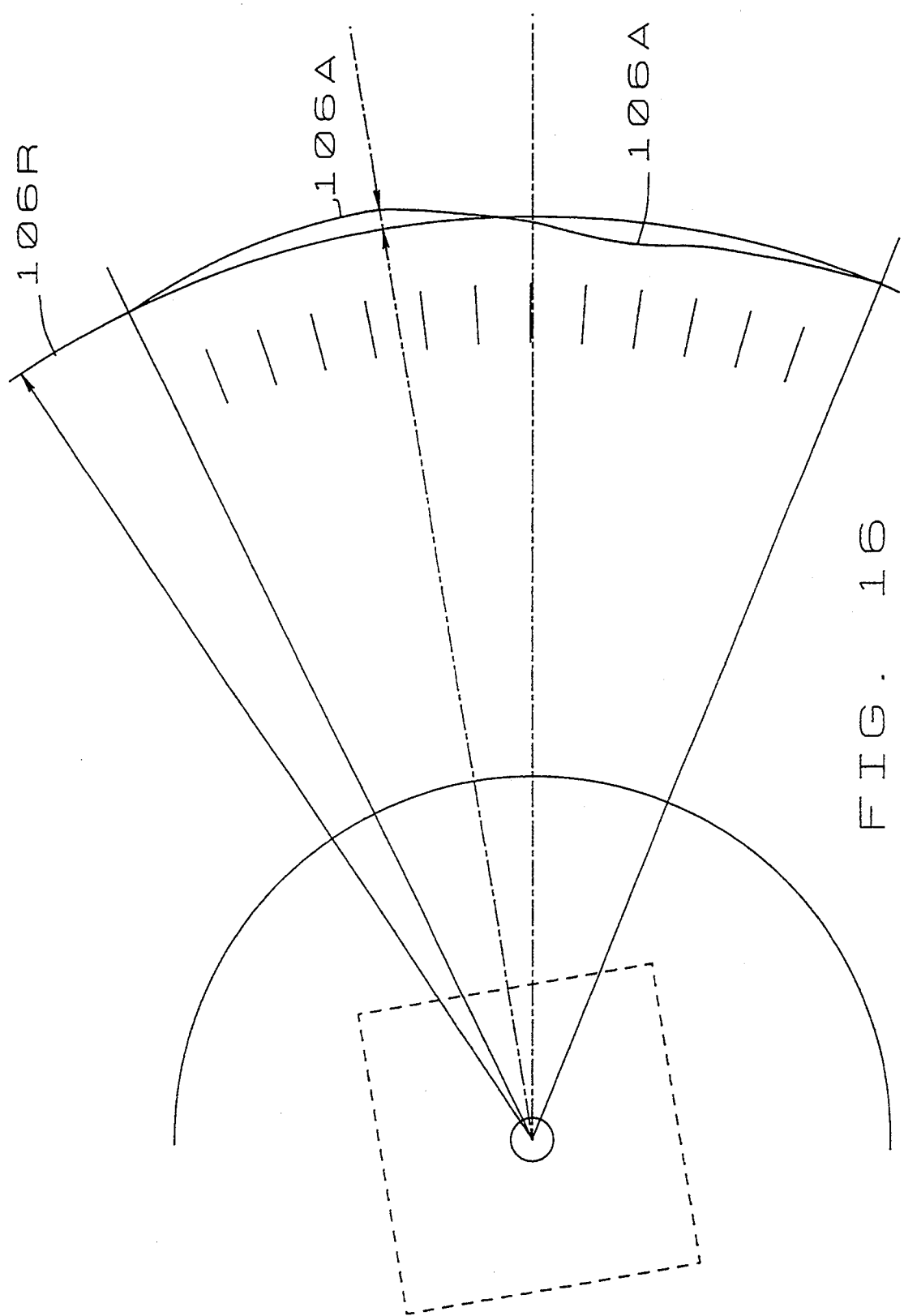
FIG. 16 illustrates the deviation of the centerline of the track guide from a circle for the guide roller of the skimmer roller guide assembly.
Figure 17:
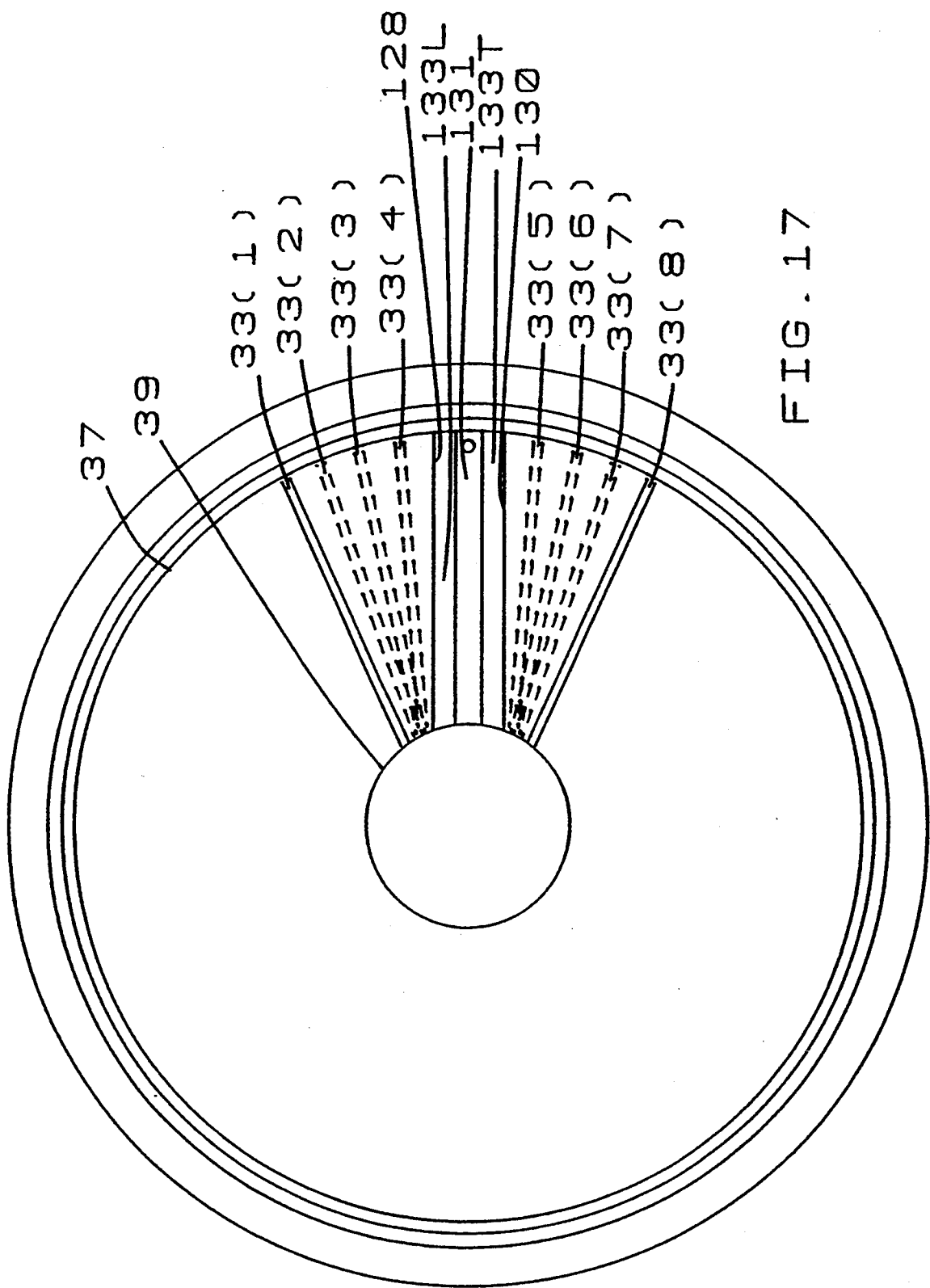
FIG. 17 is a plan view of the clarifier showing the skimmer in progressive tracking positions as the skimmer moves through the scum trough area.

In FIG. 16, the line 106A represents the centerline of the track guide 107. As shown in FIGS. 14A and 16, the track guide 107 causes the guide roller 79 to deviate from the radius 106R normally traced by the guide roller 79 into a path 106A that increases and decreases in radius as the support truss 31 rotates about the axis of the tank 13 in the trough area. The guide roller 79 is directed into the track guide 107 by an entry horn 111. The track guide 107 has inner and outer walls 113, 115 between which the guide roller 79 is compelled to travel as the support truss 31 rotates through the scum trough area 35. Referring to FIGS. 16 and 17, as the skimmer 33 approaches the scum trough 35 the walls 113, 115 of the track guide 107 cause the guide roller 79 and attached control arm 77 to move radially outward causing the skimmer 33 to begin pivoting about the axis of the pivot shaft 59 from a radial position towards a position parallel to the scum trough 35, as illustrated in FIG. 17 by the successive skimmer positions 33(I)–33-(III). When the skimmer 33 is located over the scum trough 35 the track guide 107 maintains the skimmer 33 in its parallel position until the skimmer 33 has passed over the scum trough 35, skimmer positions 33(IV) and 33(V). As the skimmer 33 departs the scum trough area 35, the track guide walls 113, 115 cause the guide roller 79 and the attached control arm 77 to move radially inward causing the skimmer 33 to begin pivoting about the axis of the pivot shaft 59 back towards its normal radial orientation, skimmer positions 33(VI)–33(VIII). The track guide 107 causes the guide roller 79 and control arm 77 to move to their normal radius at the exit 117 of the track guide 107.

Figure 18:
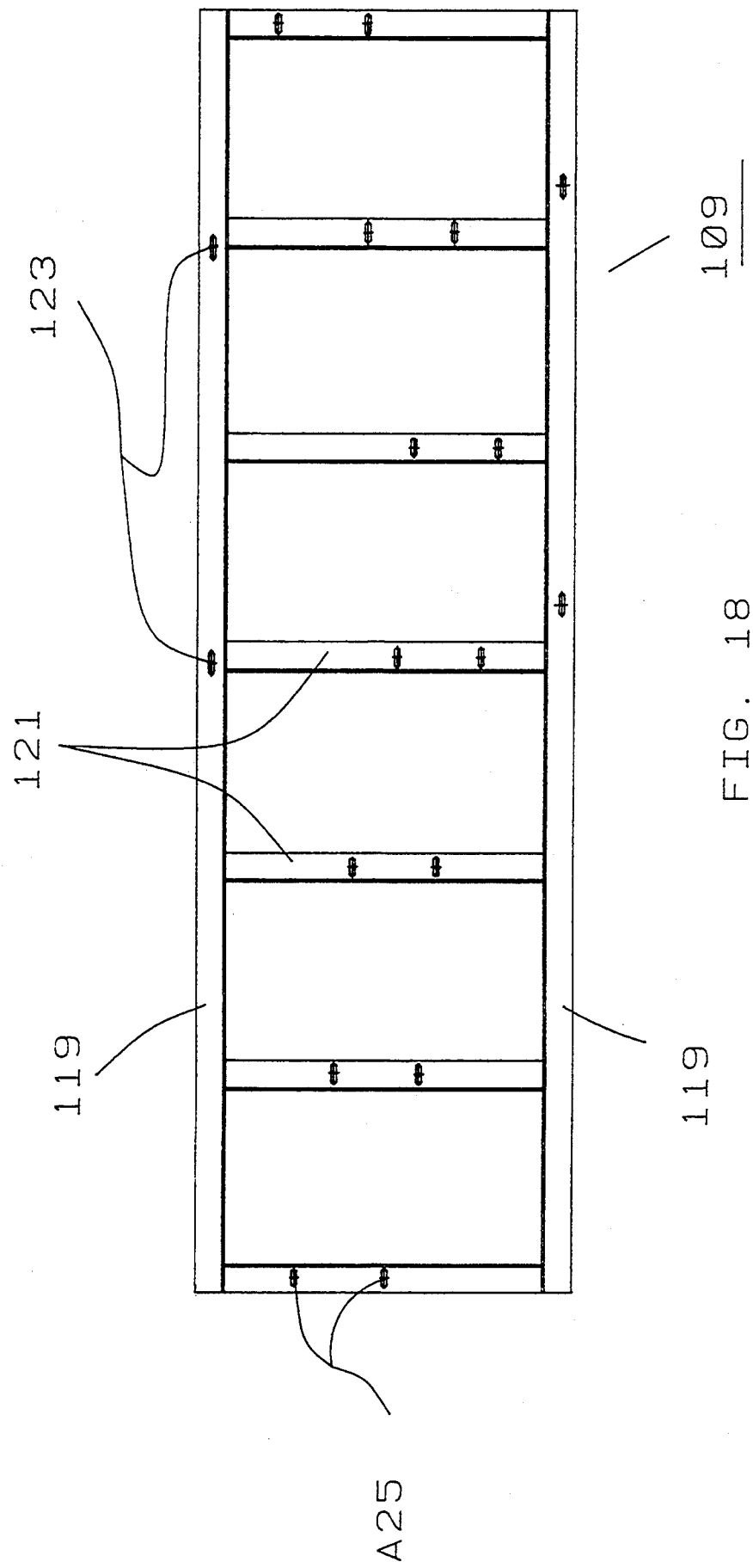
FIG. 18 is a plan view of the track support frame.

Referring to FIGS. 14A, 14B and 18, the track guide 107 is fixedly located in the tank 13 relative to the scum trough 35 by the track support frame 109. The track support frame 109 is formed of two edge members 119 coupled together by cross-rib members 121. Bridge mounting holes 123 and track mounting holes 125 extend through the members 119, 121. In a preferred embodiment, as shown in FIGS. 1A, 1B, and 14B, the track support frame 109 is securely attached to the walkway 44 above the scum trough 35 by bolts extending through the bridge mounting holes 123 into the bottom 127 of the walkway 44. If the walkway 44 does not extend over the scum trough 35 a track support truss (not shown) may be extended over the scum trough 35 and the track support frame 109 attached to the track support truss. The track guide 107 is securely attached to the track support frame 109 by bolts extending through the track mounting holes 125.

The scum trough 35 accepts and removes waste material collected by the skimmers 33. As shown in FIGS. 1A, 1B, and 19–21, the scum trough 35 extends from the scum baffle 37 to the influent well 39. The scum trough is comprised of trough walls 129, a trough mouth 131, trough beaches 133L and 133T having a leading and trailing edge 128, 130, and a trough floor 135. The leading edge 128 and the trailing edge 130 of the beaches 133 extend parallel to the trough walls 129. The skimmers 33 wipe across the trough beaches 133 and dump accumulated scum into the trough mouth 131. Flat bars 137 are located extending between the trough walls 129 at a 45 degree angle flush with the trough mouth 131 to clean the skimmer wipers 71 and to prevent the skimmer blades 45 from entering the trough mouth 131 as the skimmer 33 passes over the trough mouth 131. The material dumped into the trough mouth 131 falls to the trough floor 135. The trough floor 135 is angled downwards so that the waste material flows down the trough floor 135 to a discharge pipe 139. A collar 141 is located in the trough walls 129 to which piping may be attached for the purpose of flushing the waste material down the trough floor 135 into the discharge pipe 139. The waste material is removed from the clarifying tank 13 through the discharge pipe 139.

As shown in FIG. 22, the size of the scum trough 35 is relatively small compared to a conventional scum trough 143. Skimmer blades 45 that may be oriented parallel to the trough mouth 131 at the leading edge 128 of the trough beach 133L remove the need for large trough beaches, therefore, the trough beaches 133 of the scum trough 35 are relatively small, significantly reducing the size of the scum trough 35 compared to a conventional scum trough 143.

In a preferred embodiment, the clarifying tank 13 is 62 feet in diameter. The components of the tank 13, including the center pier 19, the basin floor 15, the outer wall 17, the drive cage 23, the drive 25, the central platform 27, the truss rake scrapers 29, the scum baffle 37, the influent well 39, and the walkway 44, are conventional in nature, except the support trusses 31, the skimmers 33, and the scum trough 35. The skimmers 33, skimmer roller guide assembly 41, track assembly 42 and scum trough 35 described above may be installed on an existing clarifying tank 11 or included as part of a newly constructed clarifying tank 11.

The skimmers 33 are formed of materials not readily subject to corrosion so the skimmers 33 will have a long useful life period. The boom pipe 53 is a 3" diameter aluminum pipe that extends 18 feet and is capped at the ends 61 of the pipe. The hangers 57 are formed of stainless steel, and, as shown in FIG. 4, extend about the boom pipe 53 and are bolted through the diameter of the pipe 53. The boom plate 55 is formed of ¼ inch thick steel plate having a length of 8 feet 5 inches, extending to a height of 5 inches from the top of the boom pipe 53. The pivot shaft 59 is a 1½ inch diameter steel rod extending 17¼ inches upwards from the boom plate 53 and extending about and being coupled to 3 inches of the boom plate 53 along the pivot shaft's 59 vertical axis.

Each skimmer blade 45 is formed of a ⅛ inch thick aluminium blade that is 10 feet 3½ inches long and 11 inches high with a 2 inch overhang extending at right angles from the body of the blade 45. The wipers 71 are formed of a ¼ inch thick strip of neoprene that extends 10 feet 1 inch and is 2½ inches in height. The backup strip 75 is a ⅛ inch × 1 inch × 10 feet stainless steel strip bolted to a skimmer blade 45 by stainless steel bolts. The back up plates 65 are formed of ⅜ inch thick 8 × 9 inch neoprene strips. The ends 43A and 43B of the skimmer blades are formed from 6 × 10 inch strips of ¼ inch thick polyurethane. The skimmer frame bars 49 are formed with 16 inch long 1 inch square aluminum bars. The skimmer extension springs 51 are formed of stainless steel.

The skimmer roller guide assembly 41 is fixedly coupled to the skimmers 33. In a preferred embodiment, the control arm 77 is formed of a 36 inch long 1½ inch diameter steel pipe with tubes at each end of the pipe. The tubes form the joint end 87 and the guide arm end 97 of the control arm 77. The tubes accept the pivot shaft 59 and the guide roller arm 95, respectively, and allow the pivot shaft 59 and the guide roller arm 95 to be bolted therein. The guide roller arm 95 extends 6 inches upward from the control arm 77 and is formed of a 1½ inch diameter stainless steel bar. The guide roller 79 is a wheel formed of high density plastic rotatably coupled to the guide roller arm 95. It has a diameter of 4 inches. The joint 87 is mounted on oil impregnated bearings 105 located within the pivot bearing housing 85 so that the joint 87 may rotate on the support truss 31.

The return spring plate 83 is an elongated 3/16 inch thick steel plate that is bent slightly downwards at the ends of the plate 83 with respect to the support truss 31 to which it is attached. The return spring plate 83 is 5½ inches wide at is widest point and is 2 feet 11 inches long. A 2 inch diameter hole 83A is centered in the return spring plate 83 through which the pivot shaft 59 extends. The plate 83 is bolted to the support truss about the 2 inch center hole so that the plate 83 extends outward from the support truss 31 a distance of 1 foot 5½ inches. The spring aperture 101 is a 9/16 inch hole located near the outward extending end of the return spring plate 83. The return spring 93 is formed of stainless steel to be resistant to corrosion.

The track assembly 42 is formed of rugged materials. In a preferred embodiment, the track support frame members 119, 121 are formed of steel. The two edge members 119 are 10 feet 9 inches long, and the cross-rib members 121 are 2 feet 8¼ inches long. The ends of cross-rib members 121 are welded together with the edge members 119 so the cross-rib members 121 extend transverse to each edge member 119. The track guide 107 is also formed of steel. The track guide 107 is mounted on the track support frame 109 so the inner and outer track guide walls are located about 4½ inches apart.

The scum trough 35 is formed of ¼ inch steel plate. The scum trough 35 is 46 inches wide, 21 feet 5¾ inches long, and 2 feet 8 inches deep at its deepest point. The scum trough mouth 131 measures one foot across. Each trough beach 133L, 133T is 5 feet ½ inches wide. Trough beach supports 134 extend downward from the trough beaches 133L, 133T and are 12½ inches wide. The trough walls 129 vary in height in accordance with the depth of the inclined trough floor 135.

In operation, the support trusses 31 rotate the skimmers 33 about the tank 13. The skimmers 33 normally assume a radial position as they rotate about the axis of the tank 13. The wipers 71 of the skimmer blades 45 skim scum from the surface of wastewater located within the tank 13. As the skimmer 33 approaches the scum trough area 35 the guide roller 79 enters the entry horn 111 of the track guide 107. The track guide walls 113, 115 initially cause the guide roller 79 and the attached control arm 77 to move radially outward, thereby applying torque to the pivot shaft 59 about the joint 87 where the pivot shaft 59 is coupled to the control arm 77. The torque applied to the pivot shaft 59 causes the skimmer boom 47 to pivot about the axis of the pivot shaft 59 to a position parallel to the leading edge 128 of the scum trough 35.

The skimmer extension springs 51 pull the skimmer blades 45 into an extended position. The extended skimmer blades 45 maintain contact with the scum baffle 37 and the influent well 39 at the ends 43A and 43B of the skimmer blades 43. As the skimmer blades 45 extend each blade 45 is pulled apart, widening the gap 67 between the skimmer blades 45. The backup plates 65 slide relative to each other as the blades 45 extend thereby preventing scum from slipping between the blades 45.

Once the skimmer 33 is oriented parallel to the scum trough 35 the tracking assembly 42 and skimmer guides assembly 41 maintain the skimmer 33 in the parallel orientation as the skimmer 33 crosses the scum trough 35. The skimmer 33 dumps the scum accumulated on the skimmer wipers 71 into the scum trough mouth 131. The scum is discharged out of the scum trough 35 through the discharge pipe 139.

After dumping the scum the skimmer 33 departs from the scum trough area 35. The track guide 107 causes the guide roller 79 to move radially inward to bring the skimmer 33 back to a radial position. The rotation of the skimmer 33 caused by the track guide 107 and skimmer roller guide assembly 41 as the skimmer 33 departs the scum trough area is the reverse of the skimmer 33 rotation on approach to the scum trough described above.

When the guide roller 79 disengages from the track guide 107 at the exit of the track guide 107 the skimmer 33 is located in a radial position. The return spring assembly 81 assures that the skinnier 33 is located in a radial position. The return spring assembly 81 the scum baffle 37 and the influent well 39 maintain the skimmer 33 in a radial orientation as the skimmer 33 traverses the tank 13 until the skimmer roller guide assembly 41 enters the track guide 117 again.

It is to be understood that the apparatus of the invention may have dimensions different from those described above.

I claim:

1. A clarifying water treatment apparatus, comprising:
    a tank with a cylindrical wall means having a vertical axis, and a bottom wall;
    a support structure extending from said outer cylindrical wall means to said vertical axis of said tank;
    a support pier extending from said bottom wall of said tank upward at said vertical axis of said outer wall means;
    a skimmer truss extending from an upper end of said support pier outward for rotation;
    means supported by said support pier for rotating said skimmer truss;
    a cylindrical retaining wall located inwardly of said cylindrical wall means;
    a scum trough extending between said cylindrical wall means and said retaining wall generally along a radial line from said vertical axis and located below said skimmer truss, where said scum trough has two generally parallel side walls and ramps having leading and trailing edges generally parallel to said scum trough walls;
    an elongated skimmer supported by said skimmer truss for rotation with said skimmer truss;
    a guide supported by said support structure and located above said scum trough and said skimmer truss;
    an arm supported by said skimmer truss for pivotal movement relative to said skimmer truss, said arm having two ends where one end of said arm extends downward and is connected to said skimmer, and the other end of said arm is located to enter said guide and to position said skimmer generally parallel with said leading edge of said scum trough as said skimmer approaches and crosses said scum trough.

2. The apparatus of claim 1, wherein said elongated skimmer comprises:
    an elongated boom having two opposite ends,
    said one end of said arm being connected to said elongated boom,
    two elongated skimmer members having outer ends and inner ends respectively,
    rod means pivotally coupled to said boom and to said two skimmer members for locating said two skimmer members at spaced positions from said boom with said outer ends of said two skimmer members being located outward of said two ends of said boom respectively and said inner ends of said two skimmer members being located close to each other,
    said rod means allowing said two skimmer members to move in directions of the length of said boom to outward and inward positions relative to said two ends of said elongated boom and relative to each other such that said two skimmer members are generally parallel to said boom, and
    spring means for urging said two skimmer members to their outward positions for causing said outer ends of said two skimmer members to engage said cylindrical wall means and said retaining wall as said skimmer is rotated with said skimmer truss.

3. The apparatus of claim 2, wherein:
    said inner ends of said two skimmer members are spaced from each other forming a gap therebetween,
    extension plates coupled to said inner ends of said two skimmer members respectively in an overlapping relationship to close said gap between said inner ends of said two skimmer members when said two skimmer members move relative to each other.

4. The apparatus of claim 3, comprising:
    spring means connected to said skimmer truss and to said elongated boom for maintaining said elongated boom and said skimmer members in a general radial position relative to said axis when said arm is located out of said guide.

5. The apparatus of claim 2, comprising:
    spring means connected to said skimmer truss and to said elongated boom for maintaining said elongated boom and said skimmer members in a general radial position relative to said axis when said arm is located out of said guide.

6. An apparatus for use for skimming scum from wastewater in a tank, where said tank has a cylindrical wall means with a vertical axis, a bottom wall, a support structure extending from said outer wall to said vertical axis, a support, a skimmer truss, means for rotating said skimmer truss and a cylindrical retaining wall, comprising:
    a scum trough for extension between said cylindrical wall means and said retaining wall within said tank generally along a radial line from said vertical axis and located below said skimmer truss, where said scum trough has two generally parallel side walls and ramps having leading and trailing edges generally parallel to said scum trough walls;
    an elongated skimmer to be supported by said skimmer truss for rotation with said skimmer truss;
    a guide to be supported by said support structure and to be located above said scum trough and said skimmer truss;

an arm to be supported by said skimmer truss for pivotal movement relative to said skimmer truss, said arm having two ends where one end of said arm extends downward and is connected to said skimmer, and the other end of said arm is located to enter said guide and to position said skimmer generally parallel with said leading edge of said scum trough as said skimmer approaches and crosses said scum trough.

7. The apparatus of claim 6, wherein said elongated skimmer comprises:

an elongated boom having two opposite ends;

said one end of said arm being connected to said elongated boom;

two elongated skimmer members having outer ends and inner ends respectively;

rod means pivotally coupled to said boom and to said two skimmer members for locating said two skimmer members at spaced positions from said boom with outer ends of said two skimmer members being located outward of said two ends of said boom respectively and said inner ends of said two skimmer members being located close to each other;

said rod means allowing said two skimmer members to move in directions along the length of said boom to outward and inward positions relative to said two ends of said elongated boom and relative to each other such that said two skimmer members are generally parallel to said boom, and spring means for urging said two skimmer members to their outward positions for causing said outer ends of said two skimmer members to engage said cylindrical wall means and said retaining wall as said skimmer is rotated with said skimmer truss.

8. The apparatus of claim 7, wherein:

said inner ends of said two skimmer members are spaced from each other forming a gap therebetween;

extension plates coupled to said inner ends of said two skimmer members respectively in an overlapping relationship to close said gap between said inner ends of said two skimmer members when said two skimmer members move relative to each other.

9. The apparatus of claim 8, comprising:

spring means connected to said skimmer truss and to said elongated boom for maintaining said skimmer boom and said skimmer members in a general radial position relative to said vertical axis when said arm is located out of said guide.

10. The apparatus of claim 7, comprising:

spring means connected to said skimmer truss and to said elongated boom for maintaining said skimmer boom and said skimmer members in a general radial position relative to said vertical axis when said arm is located out of said guide.

* * * * *